United States Patent [19]
Cheong et al.

[11] Patent Number: 5,774,712
[45] Date of Patent: Jun. 30, 1998

[54] INSTRUCTION DISPATCH UNIT AND METHOD FOR MAPPING A SENDING ORDER OF OPERATIONS TO A RECEIVING ORDER

[75] Inventors: Hoichi Cheong; Hung Qui Le, both of Austin, Tex.

[73] Assignee: International Business Machines Corporation, Armonk, N.Y.

[21] Appl. No.: 770,219

[22] Filed: Dec. 19, 1996

[51] Int. Cl.[6] ........................................... G06F 9/00
[52] U.S. Cl. ............................................. 395/595
[58] Field of Search ................... 395/595, 381, 395/390

[56] References Cited

U.S. PATENT DOCUMENTS

| | | | |
|---|---|---|---|
| 4,399,507 | 8/1983 | Cosgrove et al. | 395/395 |
| 4,691,277 | 9/1987 | Kronstadt et al. | 711/213 |
| 4,912,634 | 3/1990 | Nakano et al. | 395/383 |

*Primary Examiner*—David Y. Eng
*Attorney, Agent, or Firm*—Jenkens & Gilchrist; George E. Clark; Anthony V. S. England

[57] ABSTRACT

The present invention is directed to an apparatus and method for sending and receiving instructions, or operations, in an information handling system. The operations are received in a particular, desired order, regardless of the order in which the operations are sent. The invention provides an apparatus and method which assigns a vector to each operation or sub-operation to indicate the desired receiving order of the operations. In addition, the apparatus and method implementing the invention assign a vector to the receiving unit to indicate the order into which the operations should be placed in the receiving unit. The two vectors are manipulated in such a way as to signal which operations should be accepted into which places in the receiving unit. One operation may be mapped to multiple sub-operations in the receiving unit. In addition, the mapping of the sending order of the opcode portion of the operations and the mapping of the sending order of the data portion of the operation are done in parallel, and thus the mapping does not add cycle time delay to the bus transfer time.

36 Claims, 3 Drawing Sheets

INSTRUCTION DISPATCH UNIT AND METHOD FOR MAPPING A SENDING ORDER OF OPERATIONS TO A RECEIVING ORDER

FIELD OF THE INVENTION

The present invention relates to information handling systems and methods for operating information handling systems and, more particularly, to an apparatus and method for receiving instructions in a desired order, regardless of whether the instructions are sent in the desired order.

BACKGROUND OF THE INVENTION

In a processor design, multiple instructions, or operations, may be sent on multiple busses in the same cycle without using a fixed order of the busses. For example, if there are three operations, op0, op1, and op2 (where 0, 1, and 2 are the order of the operations), these three operations are not always sent on bus0, bus1, and bus2 respectively. This creates a need to keep track of the order of the operations when they are received. Sending operations without using a fixed order on the busses may happen as the result of:

Out-of-order design nature (i.e. op1 may be ready first so it is sent on bus0, then op0 is ready next so it is sent on bus1).

Certain operations can only go to a certain bus (i.e. op0 is a divide instruction which can only go on bus2 which connects to a divide execution unit while op1 is an add which can go on either bus0 or bus1 to an ALU).

An operation may be spawned into several sub-operations (sub-ops) and each sub-op takes a certain bus (i.e. op0 is spawned into op0a and op0b, op0b may need to go on bus2, op0a on bus0, and op1 on bus1).

A common receiving unit which accepts all busses must receive the operations in order, regardless of the order in which the operations are sent. Furthermore, for the operation spawning case in which an operation is divided into sub-operations certain information which is common between the two sub-ops must be received from a common bus into separate places (i.e. data for sub-op 0a on bus0 and data for sub-op 0b on bus2 must be received from bus0). Also, information which is not common between the two sub-ops must be received from separate busses into separate places (i.e. opcode for sub-op 0a on bus0 and opcode for sub-op 0b on bus2 must be received from bus0 and bus2 respectively).

Consequently, there is a need to be able to map a sending order of instructions, or operations, to a different receiving order. There is also a need to handle the situation where operations are spawned into several sub-operations, each of which is sent on a separate bus.

SUMMARY OF THE INVENTION

Accordingly, the present invention is directed to an apparatus and method for sending and receiving instructions, or operations, in an information handling system. The operations are received in a particular, desired order, regardless of the order in which the operations are sent. This invention provides an apparatus and method which assigns a vector to each operation or sub-operation to indicate the desired receiving order of the operations. In addition, the apparatus and method implementing the invention assigns a vector to the receiving unit to indicate the order into which the operations should be placed in the receiving unit.

The two vectors are manipulated in such a way as to signal which operations should be accepted into which places in the receiving unit, for example, ensuring that older operations are accepted into older places. The manipulation is performed on the pointers that control the selection of the operation to the receiver and does not add any cycle time delay to the bus transfer time as compared to an implementation that sends and receives operations in fixed bus order.

It is an advantage of the present invention that multiple operations may be sent on multiple busses in any order, and will be received in the desired order in the receiving unit. It is a further advantage of the present invention that one operation may be mapped to multiple sub-operations in the receiving unit. It is another advantage of the invention that the mapping of the sending order of the opcode portion of the operations and the mapping of the sending order of the data portion of the operation are done in parallel, and this mapping does not add cycle time delay to the bus transfer time.

DETAILED DESCRIPTION OF A PREFERRED EMBODIMENT OF THE INVENTION

The preferred embodiment describes an implementation that supports the Fixed Point Unit of the PowerPC architecture (PowerPC is a trademark of International Business Machines Corp.). The same scheme can be adapted to support other execution units as well as other architectures.

Figure 1:
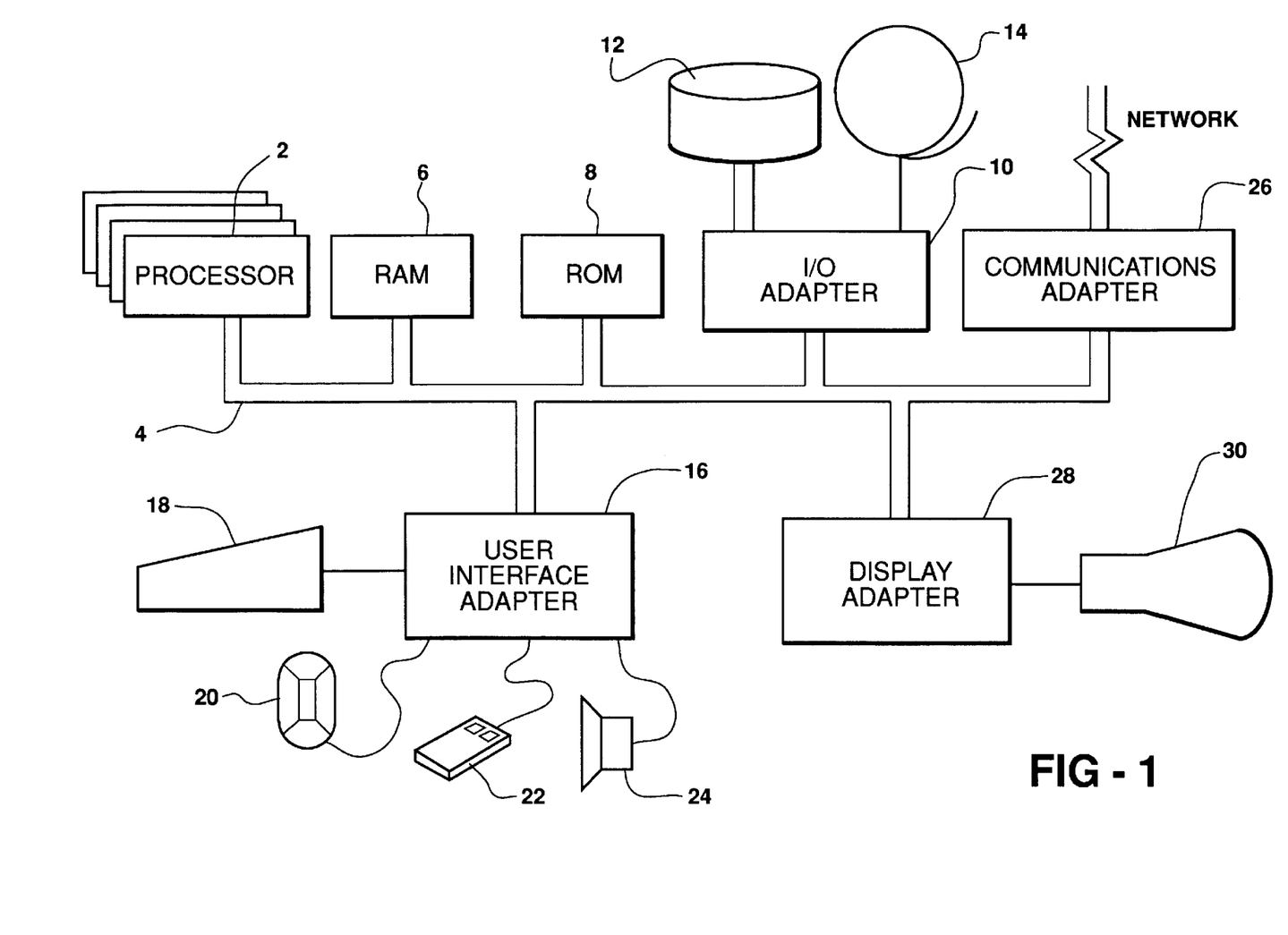
FIG. 1 is a block diagram of an information handling system embodying the present invention.

A typical information handling system is depicted in FIG. 1 and includes at least one processor 2. Processor 2 is interconnected via system bus 4 to random access memory (RAM) 6, read only memory (ROM) 8, and input/output (I/O) adapter 10 for connecting peripheral devices such as disk units 12 and tape drives 14 to bus 4, user interface adapter 16 for connecting keyboard 18, mouse 22, speaker 24, microphone 20, and/or other user interface devices such as a touch screen device (not shown) to bus 4, communication adapter 26 for connecting the information handling system to a data processing network, and display adapter 28 for connecting bus 4 to display device 30.

Figure 2:
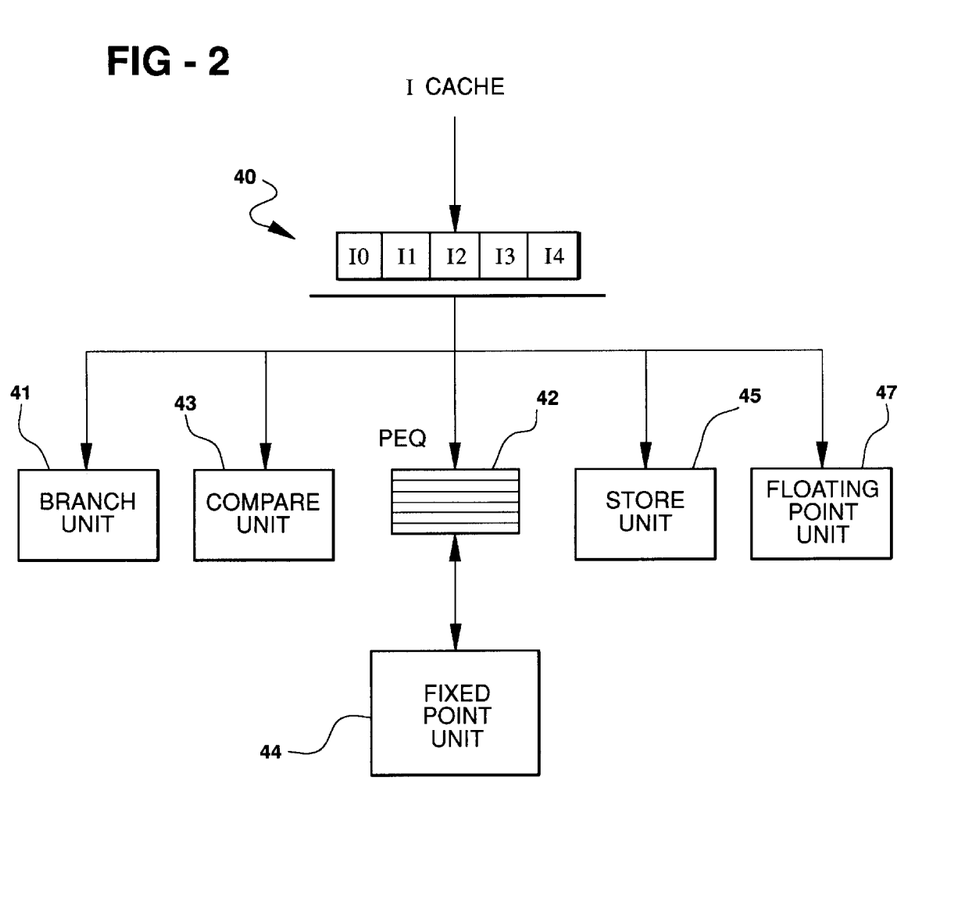
FIG. 2 is a block diagram of the architecture of a system embodying the present invention, including a high-level view of the instruction queue, the pre-execution queue, and the fixed point unit.

FIG. 2 shows a high level overview of a processor 2, comprising instruction queue 40, pre-execution queue (PEQ) 42, fixed point unit 44, branch unit 41, compare unit 43, store unit 45, and floating point unit 47. The instructions in instruction queue 40 come from an instruction cache or other memory units (not shown). Instructions are gated into PEQ 42, which holds instructions and data to be sent to fixed point unit 44. After fixed point unit 44 executes the instructions, the results are sent back to PEQ 42 for further processing.

For illustrative purposes the preferred implementation describes an implementation that supports PowerPC architecture. The load update (ldu) instruction is used to illustrate the method used by the present invention to handle the case where one instruction is spawned into two sub-ops.

The load update instruction in the PowerPC architecture has the form of: opcode RT RA RB. The operation of the instruction consists of two steps:

Fetch from address (RA)+(RB) and put the result in RT.
Save the address (RA)+(RB) in RA.

In the preferred processor implementation there are up to five instructions dispatched from instruction queue (IQ) 40 to Pre-Execution Queue (PEQ) 42. Instructions are dispatched on ports I0 through I4. Each load update instruction is spawned into two sub-ops, a load sub-op which is dispatched on the port that the load update is initially assigned, and an add sub-op which is dispatched from port I4 for the first load update and port I3 for the second load update. Associated with each instruction in IQ 40 is a bit which indicates if the instruction is destined for PEQ 42, and an instruction type bit which indicates if the instruction is a load update type of instruction.

Figure 3:
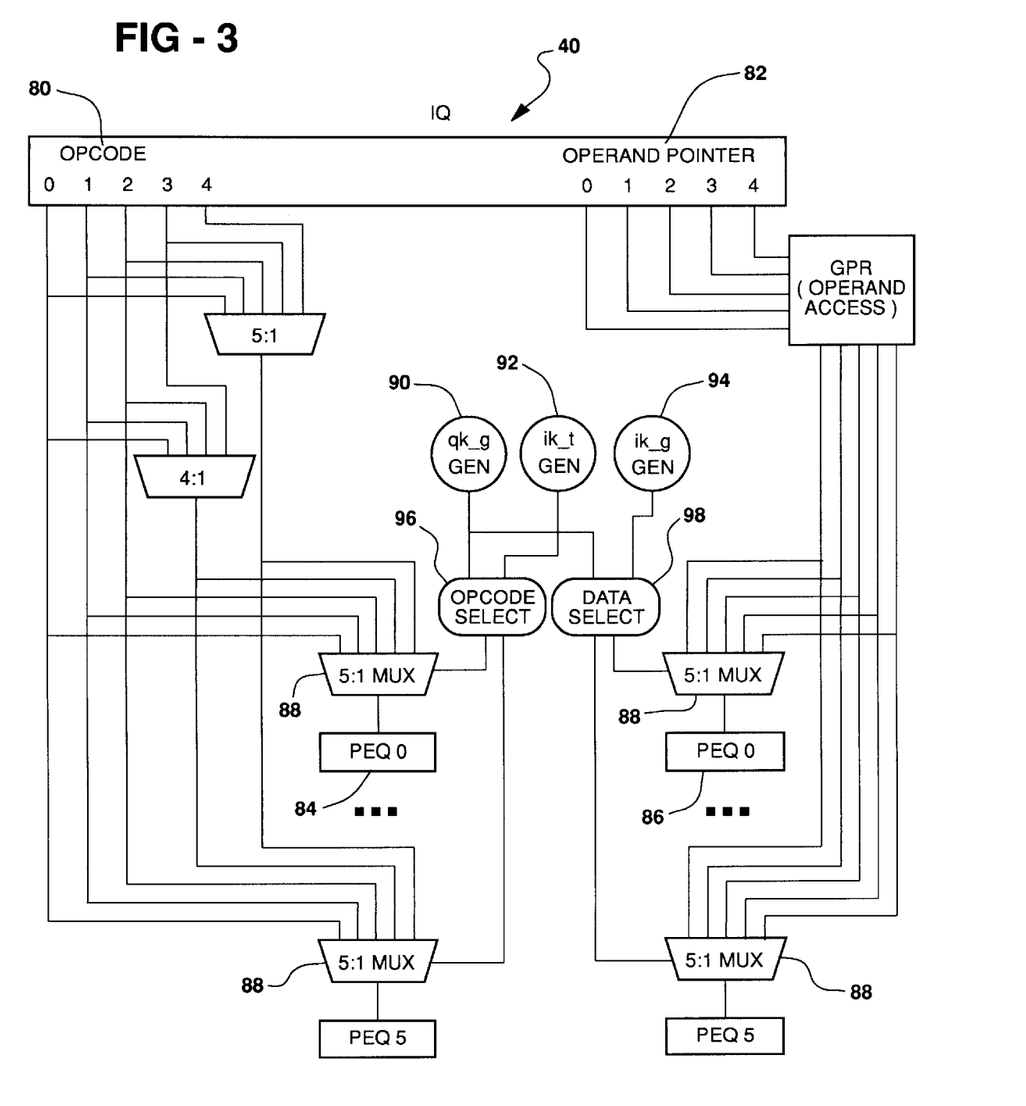
FIG. 3 is a block diagram showing the opcode and data flow from the instruction queue to the pre-execution queue according to the present invention.

Referring now to FIG. 3, the opcode 80 and data, or operand 82, flow from IQ 40 to PEQ 42 will be described. PEQ 42 has six entries, referred to as entries PEQ0 through PEQ5. In FIG. 3, each instruction sent to PEQ 42 is shown as consisting of an opcode portion and a data portion for each PEQ entry. For example, there is PEQ0 opcode 84, PEQ0 data 86, and so on. In front of each PEQ entry is a 5 to 1 multiplexer 88 that receives the five instruction busses (from ports I0 through I4). Select control signals generated by the scheme described below control the multiplexers. Each entry in PEQ 42 is marked with a V bit to indicate if it is occupied (V=0 means the entry is empty). Older instructions are received into the lowest empty entry in PEQ 42, where 0 is the lowest entry. For load update instructions, the add sub-op is received into the next empty entry after the load sub-op.

For illustrative purposes, we assume that the operations (instructions 0–4) are not sent according to bus order (ports I0–I4) due to operation spawning, or because some instructions in IQ 40 are not PEQ type instructions. Also, the order of places (PEQ entries) in the receiving unit (PEQ 42) are dictated by the empty entries in PEQ 42, which is different than the dispatch order.

Let qk_g 90 be the queue in-gate vector for PEQ k. qk_g contains the receiving order of PEQ 42. It indicates which instruction can be in-gated to queue entry k. There is at most one active bit in the vector. The value of qk_g determines the receiving order as follows:

q0_g=1 means q0 can take the first dispatch instruction.

q1_g(0)=1 means q1 can take the first dispatch instruction.

q1_g(1)=1 means q1 can take the second dispatch instruction.

...

qk_g(j)=1 means qk can take the jth+1 dispatch instruction. For example: q4_g=00100 means q4 may take the third instruction.

For this implementation the lowest empty queue entry (where 0 is the lowest) is the first one to receive an instruction. Table 1 shows the method used to generate the queue in-gate order.

TABLE 1

| Q in-gate order vector | | |
|---|---|---|
| Input v0–5 = PEQ 0–5 valid bits | Output | Comment |
| 0xxxxx | q0_g(0) = 1 | q0 takes first |
| 10xxxx | q1_g(0) = 1 | q1 takes first |
| 00xxxx | q1_g(1) = 1 | q1 takes second |
| 110xxx | q2_g(0) = 1 | q2 takes first |
| 100xxx | q2_g(1) = 1 | q2 takes second |
| 010xxx | q2_g(1) = 1 | |
| 000xxx | q2_g(2) = 1 | q2 takes third |
| 1110xx | q3_g(0) = 1 | q3 takes first |
| 1100xx | q3_g(1) = 1 | q3 takes second |
| 1010xx | q3_g(1) = 1 | |
| 0110xx | q3_g(1) = 1 | |
| 1000xx | q3_g(2) = 1 | q3 takes third |
| 0010xx | q3_g(2) = 1 | |
| 0100xx | q3_g(2) = 1 | |
| 0000xx | q3_g(3) = 1 | q3 takes fourth |
| 11110x | q4_g(0) = 1 | q4 takes first |
| 11100x | q4_g(1) = 1 | q4 takes second |
| 11010x | q4_g(1) = 1 | |
| 10110x | q4_g(1) = 1 | |
| 01110x | q4_g(1) = 1 | |
| 00110x | q4_g(2) = 1 | q4 takes third |
| 01100x | q4_g(2) = 1 | |
| 01010x | q4_g(2) = 1 | |
| 10010x | q4_g(2) = 1 | |
| 10100x | q4_g(2) = 1 | |
| 11000x | q4_g(2) = 1 | |
| 00010x | q4_g(3) = 1 | q4 takes fourth |
| 00100x | q4_g(3) = 1 | |
| 01000x | q4_g(3) = 1 | |
| 10000x | q4_g(3) = 1 | |
| 00000x | q4_g(4) = 1 | q4 takes fifth |
| 111110 | q5_g(0) = 1 | q5 takes first |
| 111100 | q5_g(1) = 1 | q5 takes second |
| 111010 | q5_g(1) = 1 | |
| 110110 | q5_g(1) = 1 | |
| 101110 | q5_g(1) = 1 | |
| 011110 | q5_g(1) = 1 | |
| 111000 | q5_g(2) = 1 | q5 takes third |
| 110100 | q5_g(2) = 1 | |
| 110010 | q5_g(2) = 1 | |
| 101100 | q5_g(2) = 1 | |
| 101010 | q5_g(2) = 1 | |
| 100110 | q5_g(2) = 1 | |
| 011100 | q5_g(2) = 1 | |
| 011010 | q5_g(2) = 1 | |
| 010110 | q5_g(2) = 1 | |
| 001110 | q5_g(2) = 1 | |
| 110000 | q5_g(3) = 1 | q5 takes fourth |
| 101000 | q5_g(3) = 1 | |
| 100100 | q5_g(3) = 1 | |
| 100010 | q5_g(3) = 1 | |
| 011000 | q5_g(3) = 1 | |
| 010100 | q5_g(3) = 1 | |
| 010010 | q5_g(3) = 1 | |
| 001100 | q5_g(3) = 1 | |
| 001010 | q5_g(3) = 1 | |
| 000110 | q5_g(3) = 1 | |
| 100000 | q5_g(4) = 1 | q5 takes fifth |
| 010000 | q5_g(4) = 1 | |
| 001000 | q5_g(4) = 1 | |
| 000100 | q5_g(4) = 1 | |
| 000010 | q5_g(4) = 1 | |

Let ik_a (not shown in FIG. 3) be the vector that reflects the "age" of dispatched instruction k that is destined for PEQ k. ik_a is called the PEQ Instruction age vector (where the instruction in IQ0 is the oldest, then IQ1, and so on). There is at most one active bit in the vector. The value of ik_a represents instruction age as follows:

i0_a=1 means i0 is the oldest PEQ instruction.

i1_a(0)=1 means i1 is the oldest PEQ instruction.

i1_a(1)=1 means i1 is the 2nd oldest PEQ instruction.

...

ik_a(j)=1 means ik is the jth+1 oldest PEQ instruction. Example: i3_a=0100 means i3 is the second oldest PEQ instruction.

In this implementation the lowest PEQ instruction in IQ 40 (where 0 is the lowest) is the first instruction to be received into PEQ 42. Table 2 shows how the PEQ Instruction age vector is generated.

TABLE 2

PEQ Instruction Age Vector

| Input p0–p4 = IQ0–IQ4 PEQ instruction | Output | Comment |
|---|---|---|
| 1 x x x x | i0_a(0) = 1 | i0 is first |
| 0 1 x x x | i1_a(0) = 1 | i1 is first |
| 1 1 x x x | i1_a(1) = 1 | i1 is second |
| 0 0 1 x x | i2_a(0) = 1 | i2 is first |
| 0 1 1 x x | i2_a(1) = 1 | i2 is second |
| 1 0 1 x x | i2_a(1) = 1 | |
| 1 1 1 x x | i2_a(2) = 1 | i2 is third |
| 0 0 0 1 x | i3_a(0) = 1 | i3 is first |
| 0 0 1 1 x | i3_a(1) = 1 | i3 is second |
| 0 1 0 1 x | i3_a(1) = 1 | |
| 1 0 0 1 x | i3_a(1) = 1 | |
| 0 1 1 1 x | i3_a(2) = 1 | i3 is third |
| 1 0 1 1 x | i3_a(2) = 1 | |
| 1 1 0 1 x | i3_a(2) = 1 | |
| 1 1 1 1 x | i3_a(3) = 1 | i3 is fourth |
| 0 0 0 0 1 | i4_a(0) = 1 | i4 is first |
| 0 0 0 1 1 | i4_a(1) = 1 | i4 is second |
| 0 0 1 0 1 | i4_a(1) = 1 | |
| 0 1 0 0 1 | i4_a(1) = 1 | |
| 1 0 0 0 1 | i4_a(1) = 1 | |
| 0 0 1 1 1 | i4_a(2) = 1 | i4 is third |
| 0 1 0 1 1 | i4_a(2) = 1 | |
| 1 0 0 1 1 | i4_a(2) = 1 | |
| 0 1 1 0 1 | i4_a(2) = 1 | |
| 1 1 0 0 1 | i4_a(2) = 1 | |
| 1 0 1 0 1 | i4_a(2) = 1 | |
| 0 1 1 1 1 | i4_a(3) = 1 | i4 is fourth |
| 1 1 1 0 1 | i4_a(3) = 1 | |
| 1 1 0 1 1 | i4_a(3) = 1 | |
| 1 0 1 1 1 | i4_a(3) = 1 | |
| 1 1 1 1 1 | i4_a(4) = 1 | i4 is fifth |

Load update instruction (ldu) is spawned into 2 sub-ops, a load sub-op and an add sub-op. Each sub-op has a different opcode but uses the same data (RA and RB). The load sub-op is dispatched on the original ldu dispatch port, and the add sub-op is dispatched on IQ4 port for the first ldu and on IQ3 port for the second ldu. The opcode for the add sub-op is sent on the port assigned to itself, however its data are sent on the load sub-op port.

The sending order must be modified to reflect the order of the spawned sub-op. Let ik_t(j) 92 be defined as the instruction sending order vector for the opcode. The value of ik_t(j) defines the sending order in the following way:

i0_t=1 means i0 is the first instruction of which the opcode field is destined for PEQ.

i1_t(0)=1 means i1 is the first instruction of which the opcode field is destined for PEQ.

i1_t(1)=1 means i1 is the second instruction of which the opcode field is destined for PEQ.

ik_t(j)=1 means ik is the jth+1 instruction of which the opcode field is destined for PEQ.

Example: i3_t =0100 means i3 is the second instruction of which the opcode fields should be sent to PEQ.

ik_t(j) 92 is obtained by modifying the PEQ Instruction age vector (ik_a(j)) as shown in Table 3. Note that the instruction sending order vector for the opcode of the add sub-op of the load update instruction takes the order immediately next to the load sub-op, and the order of subsequent instructions are adjusted accordingly (i.e. shifted right).

TABLE 3

Instruction order vector for opcode

| Inputs | | | | | Outputs | | | | |
|---|---|---|---|---|---|---|---|---|---|
| i0 | i1 | i2 | i3 | i4 | i0_t | i1_t | i2_t | i3_t | i4_t |
| — | — | — | — | — | i0_a | i1_a | i2_a | i3_a | i4_a |
| ldu | — | — | — | — | i0_a | i1_a+1 | i2_a+1 | i3_a+1 | i0_a+1 |
| — | ldu | — | — | — | i0_a | i1_a | i2_a+1 | i3_a+1 | i1_a+1 |
| — | — | ldu | — | — | i0_a | i1_a | i2_a | i3_a+1 | i2_a+1 |
| — | — | — | ldu | — | i0_a | i1_a | i2_a | i3_a | i3_a+1 |
| ldu | ldu | — | — | — | i0_a | i1_a+1 | i2_a+2 | i1_a+2 | i0_a+1 |
| ldu | — | ldu | — | — | i0_a | i1_a+1 | i2_a+1 | i2_a+2 | i0_a+1 |
| — | ldu | ldu | — | — | i0_a | i1_a | i2_a+1 | i2_a+2 | i1_a+1 |

—means not ldu instruction
(Note that the increment function is performed by shifting the original instruction order vector right by the appropriate amount and extending the output vector by the appropriate number of bits).

Let ik_g 94 be the instruction sending order vector for the data. If there is no load update instruction in IQ0-3 then ik_g is set equal to ik_a. Else, the following steps are performed:

1) shift ik_a as indicated in Table 3

2) if the ldu in Table 3 specifies that i4_t column takes the shifted ik, then set ik_g to the shifted ik_a.

3) set i4_g to 0.

4) if the ldu in Table 3 specifies that i3_t column takes the shifted ik, then set ik_g to the shifted ik_a.

5) set i3_g to 0.

Steps 2 through 5 above effectively transfer the order of the add sub-op from ports 3 and 4 back to the port that contains the load sub-op (the original load update port). The instruction sending order vector for the data of the load update has two active bits. The first bit is the order of the load sub-op and the second bit is the order of the add sub-op.

The intersection between qk_g(j) 90 vector and ik_t(j) 92 vector is the PEQ opcode select control 96 (shown in FIG. 3) which indicates which opcode (from ports I0–I4) is selected for which queue entry. This selection is made as follows:

qk_select_opcode(j)=select opcode from port j to queue k.

The method for setting qk_select_opcode(j) is shown in Table 4.

TABLE 4

PEQ Instruction select for opcode

| Outputs →<br>Inputs → | qk_select_opcode<br>(0)<br>i0_t | | qk_select_opcode<br>(1)<br>i1_t | | | qk_select_opcode<br>(2)<br>i2_t | | | | | qk_select_opcode<br>(3)<br>i3_t | | | | | qk_select_opcode<br>(4)<br>i4_t | | | | |
|---|---|---|---|---|---|---|---|---|---|---|---|---|---|---|---|---|---|---|---|---|
| ↓ | 0 | | 0 | 1 | 2 | 0 | 1 | 2 | 3 | 4 | 0 | 1 | 2 | 3 | 4 | 0 | 1 | 2 | 3 | 4 |
| qk_g(0) | x | | x | | | x | | | | | x | | | | | x | | | | |
| qk_g(1) | | | | x | | | x | | | | | x | | | | | x | | | |
| qk_g(2) | | | | | x | | | x | | | | | x | | | | | x | | |
| qk_g(3) | | | | | | | | | x | | | | | x | | | | | x | |
| qk_g(4) | | | | | | | | | | x | | | | | x | | | | | x | x denotes an AND operation of the corresponding input column and row.
The output is the OR of the AND terms (denote by x) within each column associated with each output The intersection between qk_g(j) vector 90 and ik_g(j) vector 94 is PEQ data select control 98 (shown in FIG. 3) which indicates what data (from port I0–I4) is selected for each queue entry. PEQ data select control 98 is defined as follows:

qk_select_data(j)=select data from port j to queue k.
The method of setting qk_select_data(j) 98 is shown in Table 5.

TABLE 5

PEQ Instruction select for data

| Outputs →<br>Inputs → | qk_select_data<br>(0)<br>i0_g | | qk_select_data<br>(1)<br>i1_g | | | | qk_select_data<br>(2)<br>i2_g | | | | | qk_select_data<br>(3)<br>i3_g | | | | | qk_select_data<br>(4)<br>i4_g | | | | |
|---|---|---|---|---|---|---|---|---|---|---|---|---|---|---|---|---|---|---|---|---|---|
| ↓ | 0 | 1 | 0 | 1 | 2 | 3 | 0 | 1 | 2 | 3 | 4 | 0 | 1 | 2 | 3 | 4 | 0 | 1 | 2 | 3 | 4 |
| qk_g(0) | x | | x | | | | x | | | | | x | | | | | x | | | | |
| qk_g(1) | | x | | x | | | | x | | | | | x | | | | | x | | | |
| qk_g(2) | | | | | x | | | | x | | | | | x | | | | | x | | |
| qk_g(3) | | | | | | x | | | | x | | | | | x | | | | | x | |
| qk_g(4) | | | | | | | | | | | x | | | | | x | | | | | x | x denotes an AND operation of the corresponding input column and row.
The output is the OR of the AND terms (denote by x) within each column associated with each output Example 1 shows how the select vectors are generated and how instructions are in-gated to PEQ 42 while proper order is maintained.

EXAMPLE 1

Three PEQ instructions are in the IQ. Entries 0, 1, 3, and 5 in the PEQ are empty.

| IQ0–4 | PEQ V0–5 | Comment |
|---|---|---|
| a - ldu c - | 0 0 1 0 1 0 | a,c are PEQ instructions<br>ldu is load update<br>- indicates instruction<br>is not valid or is not<br>destined for PEQ. |

| | bits | | | | | |
|---|---|---|---|---|---|---|
| | 0 | 1 | 2 | 3 | 4 | Comment |
| q0_g | 1 | | | | | PEQ ingate (or receiving) order |
| q1_g | 0 | 1 | | | | is |
| q2_g | 0 | 0 | 0 | | | Q0 first |
| q3_g | 0 | 0 | 1 | 0 | | Q1 second |

-continued

| q4_g | 0 | 0 | 0 | 0 | 0 | Q3 third |
|---|---|---|---|---|---|---|
| q5_g | 0 | 0 | 0 | 1 | 0 | Q5 fourth |

| i0_a | 1 | | | | | PEQ instruction dispatch (or |
|---|---|---|---|---|---|---|
| i1_a | 0 | 0 | | | | sending order) order is |
| i2_a | 0 | 1 | 0 | | | i0 first |
| i3_a | 0 | 0 | 1 | 0 | | i2 second |
| i4_a | 0 | 0 | 0 | 0 | 0 | i3 third |

| i0_t | 1 | | | | | i4 is the add sub-op which is 3rd |
|---|---|---|---|---|---|---|
| i1_t | 0 | 0 | 0 | | | in order behind the ldu which is |
| i2_t | 0 | 1 | 0 | 0 | 0 | 2nd. |
| i3_t | 0 | 0 | 0 | 1 | 0 | i3 becomes 4th in order because |
| i4_t | 0 | 0 | 1 | 0 | 0 | of the ldu in i2. |

| i0_g | 1 | 0 | | | | i4 order is transposed to i2. |
|---|---|---|---|---|---|---|
| i1_g | 0 | 0 | 0 | 0 | | |
| i2_g | 0 | 1 | 1 | 0 | 0 | |
| i3_g | 0 | 0 | 0 | 1 | 0 | |
| i4_g | 0 | 0 | 0 | 0 | 0 | |

OPCODE Selection
FOR Q2,Q4:
Since q2_g and q4_g vectors are 0, the select signals for Q2 and Q4 are 0 indicating that no instruction is selected for these two entries.

q2_select_opcode(0:4)=00000
q4_select_opcode(0:4)=00000
FOR Q0:

| Outputs →<br>Inputs → | q0_select_opcode<br>(0)<br>i0_t(0) | q0_select_opcode<br>(1)<br>i1_t(0:2) | | | q0_select_opcode<br>(2)<br>i2_t(0:4) | | | | | q0_select_opcode<br>(3)<br>i3_t(0:4) | | | | | q0_select_opcode<br>(4)<br>i4_t(0:4) | | | | |
|---|---|---|---|---|---|---|---|---|---|---|---|---|---|---|---|---|---|---|---|
| ↓ | 1 | 0 | 0 | 0 | 0 | 1 | 0 | 0 | 0 | 0 | 0 | 0 | 1 | 0 | 0 | 0 | 1 | 0 | 0 |
| q0_g(0)=1 | 1 | 0 | | | 0 | | | | | 0 | | | | | 0 | | | | | qo_select_opcode(0:4)=10000 (instruction a from port 0 goes to q0)

FOR Q1:

| Outputs →<br>Inputs → | q1_select_opcode<br>(0)<br>i0_t(0) | q1_select_opcode<br>(1)<br>i1_t(0:2) | | | q1_select_opcode<br>(2)<br>i2_t(0:4) | | | | | q1_select_opcode<br>(3)<br>i3_t(0:4) | | | | | q1_select_opcode<br>(4)<br>i4_t(0:4) | | | | |
|---|---|---|---|---|---|---|---|---|---|---|---|---|---|---|---|---|---|---|---|
| ↓ | 1 | 0 | 0 | 0 | 0 | 1 | 0 | 0 | 0 | 0 | 0 | 0 | 1 | 0 | 0 | 0 | 1 | 0 | 0 |
| q1_g(0)=0 | 0 | 0 | | | 0 | | | | | 0 | | | | | 0 | | | | |
| q1_g(1)=1 | | | 0 | | | 1 | | | | | 0 | | | | | 0 | | | | q1_select_opcode(0:4)=00100 (sub-op load opcode from port 2 goes to q1)

FOR Q3:

| Outputs →<br>Inputs → | q3_select_opcode<br>(0)<br>i0_t(0) | q3_select_opcode<br>(1)<br>i1_t(0:2) | | | q3_select_opcode<br>(2)<br>i2_t(0:4) | | | | | q3_select_opcode<br>(3)<br>i3_t(0:4) | | | | | q3_select_opcode<br>(4)<br>i4_t(0:4) | | | | |
|---|---|---|---|---|---|---|---|---|---|---|---|---|---|---|---|---|---|---|---|
| ↓ | 1 | 0 | 0 | 0 | 0 | 1 | 0 | 0 | 0 | 0 | 0 | 0 | 1 | 0 | 0 | 0 | 1 | 0 | 0 |
| q3_g(0)=0 | 0 | 0 | | | 0 | | | | | 0 | | | | | 0 | | | | |
| q3_g(1)=0 | | | 0 | | | 0 | | | | | 0 | | | | | 0 | | | |
| q3_g(2)=1 | | | | 0 | | | 0 | | | | | 0 | | | | | | 1 | |
| q3_g(3)=0 | | | | | | | | 0 | | | | | 0 | | | | | | 0 | q3_select_opcode(0:4)=00001 (sub-op add opcode from port 4 goes to q3)

FOR Q5:

| Outputs →<br>Inputs → | q5_select_opcode<br>(0)<br>i0_t(0) | q5_select_opcode<br>(1)<br>i1_t(0:2) | | | q5_select_opcode<br>(2)<br>i2_t(0:4) | | | | | q5_select_opcode<br>(3)<br>i3_t(0:4) | | | | | q5_select_opcode<br>(4)<br>i4_t(0:4) | | | | |
|---|---|---|---|---|---|---|---|---|---|---|---|---|---|---|---|---|---|---|---|
| ↓ | 1 | 0 | 0 | 0 | 0 | 1 | 0 | 0 | 0 | 0 | 0 | 0 | 1 | 0 | 0 | 0 | 1 | 0 | 0 |
| q5_g(0)=0 | 0 | 0 | | | 0 | | | | | 0 | | | | | 0 | | | | |
| q5_g(1)=0 | | | 0 | | | 0 | | | | | 0 | | | | | 0 | | | |
| q5_g(2)=0 | | | | 0 | | | 0 | | | | | 0 | | | | | | 0 | |
| q5_g(3)=1 | | | | | | | | 0 | | | | | | 1 | | | | | 0 |
| q5_g(4)=0 | | | | | | | | | 0 | | | | | | 0 | | | | 0 | q5_select_opcode(0:4)=00010 (instruction c opcode from port 3 goes to q5)

The opcodes which are sent as:

| port | instruction | age (first to last) |
|------|-------------|---------------------|
| 0    | a           | 1                   |
| 1    | —           | —                   |
| 2    | ldu (load)  | 2                   |
| 3    | c           | 4                   |
| 4    | ldu (add)   | 3                   | are received into the PEQ as:

| entry | instruction | order |
|-------|-------------|-------|
| 0     | a           | 1     |
| 1     | ldu (load)  | 2     |
| 2     | —           | —     |
| 3     | ldu (add)   | 3     |
| 4     | —           | —     |
| 5     | c           | 4     |

Thus the instruction opcode out-of-order bus assignment is transformed to PEQ in-order entry assignment.

DATA SELECTION

FOR Q2,Q4:

Since q2_g and q4_g vectors are 0, the select signals for Q2 and Q4 are 0 indicating that no instruction is selected for these 2 entries.

q2_select_data(0:4)=00000 q4_select_data(0:4)=00000

FOR Q0:

| Outputs ⟶<br>Inputs ⟶ | q1_select_data<br>(0)<br>i0_g(0:1) | q1_select_data<br>(1)<br>i1_g(0:3) | q1_select_data<br>(2)<br>i2_g(0:4) | q1_select_data<br>(3)<br>i3_g(0:4) | q1_select_data<br>(4)<br>i4_g(0:4) |
|---|---|---|---|---|---|
| ↓ | 1  0 | 0  0  0  0 | 0  1  1  0  0 | 0  0  0  1  0 | 0  0  0  0  0 |
| q1_g(0)=1 | 1 | 0 | 0 | 0 | 0 | q0_select_data(0:4)=10000 (a data from port 0 goes to q0)

FOR Q1:

| Outputs ⟶<br>Inputs ⟶ | q1_select_data<br>(0)<br>i0_g(0:1) | q1_select_data<br>(1)<br>i1_g(0:3) | q1_select_data<br>(2)<br>i2_g(0:4) | q1_select_data<br>(3)<br>i3_g(0:4) | q1_select_data<br>(4)<br>i4_g(0:4) |
|---|---|---|---|---|---|
| ↓ | 1  0 | 0  0  0  0 | 0  1  1  0  0 | 0  0  0  1  0 | 0  0  0  0  0 |
| q1_g(0)=0 | 0 | 0 | 0 | 0 | 0 |
| q1_g(1)=1 | 0 | 0 | 1 | 0 | 0 | q1_select_data(0:4)=00100 (ldu data from port 2 goes to q1)

FOR Q3:

| Outputs → Inputs → | q3_select_data (0) i0_g(0:1) | | q3_select_data (1) i1_g(0:3) | | | | q3_select_data (2) i2_g(0:4) | | | | | q3_select_data (3) i3_g(0:4) | | | | | q3_select_data (4) i4_g(0:4) | | | | |
|---|---|---|---|---|---|---|---|---|---|---|---|---|---|---|---|---|---|---|---|---|---|
| ↓ | 1 | 0 | 0 | 0 | 0 | 0 | 0 | 1 | 1 | 0 | 0 | 0 | 0 | 0 | 1 | 0 | 0 | 0 | 0 | 0 | 0 |
| q3_g(0)=0 | 0 | | 0 | | | | 0 | | | | | 0 | | | | | 0 | | | | |
| q3_g(1)=0 | | | | 0 | | | | 0 | | | | | 0 | | | | | 0 | | | |
| q3_g(2)=1 | | | | | 0 | | | | 1 | | | | | 0 | | | | | 0 | | |
| q3_g(3)=0 | | | | | | 0 | | | | 0 | | | | | 0 | | | | | 0 | | q3_select_data(0:4)=00100 (ldu data from port 2 goes to q3)

FOR Q5:

| Outputs → Inputs → | q5_select_data (0) i0_g(0:1) | | q5_select_data (1) i1_g(0:3) | | | | q5_select_data (2) i2_g(0:4) | | | | | q5_select_data (3) i3_g(0:4) | | | | | q5_select_data (4) i4_g(0:4) | | | | |
|---|---|---|---|---|---|---|---|---|---|---|---|---|---|---|---|---|---|---|---|---|---|
| ↓ | 1 | 0 | 0 | 0 | 0 | 0 | 0 | 1 | 1 | 0 | 0 | 0 | 0 | 0 | 1 | 0 | 0 | 0 | 0 | 0 | 0 |
| q5_g(0)=0 | 0 | | 0 | | | | 0 | | | | | 0 | | | | | 0 | | | | |
| q5_g(1)=0 | | | | 0 | | | | 0 | | | | | 0 | | | | | 0 | | | |
| q5_g(2)=0 | | | | | 0 | | | | 0 | | | | | 0 | | | | | 0 | | |
| q5_g(3)=1 | | | | | | 0 | | | | 0 | | | | | 1 | | | | | 0 | |
| q5_g(4)=0 | | | | | | | | | | | 0 | | | | | 0 | | | | | 0 | q5_select_data(0:4) =00010 (instruction c data from port 3 goes to q5)

The data which are sent as:

| port | instruction | age (first to last) |
|---|---|---|
| 0 | a | 1 |
| 1 | — | — |
| 2 | ldu (load) | 2 |
| 3 | c | 3 |
| 4 | — | — | are received into PEQ as:

| entry | instruction | order |
|---|---|---|
| 0 | a | 1 |
| 1 | ldu (load) | 2 |
| 2 | — | — |
| 3 | ldu (add) = ldu(load) | 3 |
| 4 | — | — |
| 5 | c | 4 |

Thus the instruction data on three busses are expanded and gated into four PEQ entries in the same order as the opcodes.

If the ldu instruction in IQ2 is a regular PEQ instruction (instruction b) then the sending and receiving order for the opcode and data are:

Sending order:

| port | instruction | age (first to last) |
|---|---|---|
| 0 | a | 1 |
| 1 | — | — |
| 2 | b | 2 |
| 3 | c | 3 |
| 4 | — | — |

Receiving order:

| entry | instruction | order |
|---|---|---|
| 0 | a | 1 |
| 1 | b | 2 |
| 2 | — | — |
| 3 | c | 3 |
| 4 | — | — |
| 5 | — | — |

The above implementation describes the handling of instruction dispatch from IQ 40 to PEQ 42. However, the same technique can be applied to any type of out-of-order issue to in-order-receiver. The next generation of x86 class processors uses more superscalar techniques, and also uses the technique of dividing instruction into sub-operations. Thus, there will be a need for using the method described in this invention to transform the issuing order of operations to a different receiving order. This invention is not limited to instruction dispatching, rather it is applicable to any sending/receiving protocol. Although the present invention and its advantages have been described in detail, it should be understood that various changes, substitutions and alterations can be made herein without departing from the spirit or scope of the invention as defined in the appended claims.

What is claimed is:

1. An apparatus for dispatching instructions in an information handling system, said apparatus comprising:
    an instruction queue comprising a first number of entries, each entry capable of storing an instruction;

a receiving queue operably coupled to said instruction queue, comprising a second number of entries, each entry capable of storing an instruction;

means for sending instructions from said instruction queue in a sending order to said receiving queue, where said instructions are received in a receiving order; and means operably coupled to said instruction queue and said receiving queue for mapping said sending order to said receiving order.

2. An apparatus according to claim 1, wherein said means for mapping comprises:

for each instruction in said instruction queue, an instruction sending vector which indicates the relative age of the instruction compared to the other instructions in said instruction queue; and for each entry in said receiving queue, an in-gate vector, which indicates the receiving order of said receiving queue.

3. An apparatus according to claim 1, further comprising:

means for dividing an instruction in said instruction queue into one or more sub-instructions; and means operably coupled to said instruction queue and said receiving queue for mapping an instruction in said instruction queue to one or more sub-instructions in said receiving queue.

4. An apparatus according to claim 2, wherein said instruction sending vector and said in-gate vector are combined to create a selection signal for each receiving queue entry, wherein said selection signal determines which entry in said receiving queue receives each instruction from said instruction queue.

5. An apparatus according to claim 2, wherein said instructions comprise operations and data, and wherein said instruction sending vector comprises:

an instruction operation sending vector; and an instruction data sending vector.

6. An apparatus according to claim 5, wherein said instruction operation sending vector and said in-gate vector are combined to create an operation selection signal, wherein said operation selection signal determines which entry in said receiving queue receives the instruction operation from each instruction in said instruction queue.

7. An apparatus according to claim 5, wherein said instruction data sending vector and said in-gate vector are combined to create a data selection signal, wherein said data selection signal determines which one or more entries in said receiving queue receives the instruction data from each instruction in said instruction queue.

8. An apparatus according to claim 1, wherein said receiving order is based on age, with older instructions being received into the first available entries in said receiving queue.

9. An apparatus according to claim 3, wherein said means for mapping comprises:

means for receiving older instruction operations into the first available entries in said receiving queue; and means for receiving instruction data into each entry wherein an instruction operation requires said data.

10. A method for dispatching instructions in an information handling system, comprising the steps of:

providing an instruction queue, said instruction queue comprising a first number of entries, wherein each entry is capable of storing an instruction;

providing a receiving queue operably coupled to said instruction queue, said receiving queue comprising a second number of entries, wherein each entry is capable of storing an instruction;

sending instructions from said instruction queue in a sending order to said receiving queue;

receiving said instructions in said receiving queue in a receiving order; and mapping said sending order to said receiving order.

11. A method according to claim 10, wherein the mapping step comprises:

for each instruction in said instruction queue, creating an instruction sending vector, wherein said instruction sending vector indicates the relative age of the instruction compared to the other instructions in said instruction queue; and for each entry in said receiving queue, creating an in-gate vector, wherein said in-gate vector indicates the receiving order of said receiving queue.

12. A method according to claim 10, further comprising the steps of:

dividing an instruction in said instruction queue into one or more sub-instructions; and mapping an instruction in said instruction queue to one or more sub-instructions in said receiving queue.

13. A method according to claim 11, further comprising the step of combining said instruction sending vector and said in-gate vector to create a selection signal for each receiving queue entry, wherein said selection signal determines which entry in said receiving queue receives each instruction from said instruction queue.

14. A method according to claim 11, wherein said instructions comprise operations and data, and wherein the step of creating said instruction sending vector comprises:

creating an instruction operation sending vector; and creating an instruction data sending vector.

15. A method according to claim 14, further comprising the step of combining said instruction operation sending vector and said in-gate vector to create an operation selection signal, wherein said operation selection signal determines which entry in said receiving queue receives the instruction operation from each instruction in said instruction queue.

16. A method according to claim 14, further comprising the step of combining said instruction data sending vector and said in-gate vector to create a data selection signal, wherein said data selection signal determines which one or more entries in said receiving queue receives the instruction data from each instruction in said instruction queue.

17. A method according to claim 10, wherein said mapping step further comprises the step of receiving older instructions into the first available entries in said receiving queue.

18. A method according to claim 12, wherein said mapping step comprises the steps of:

receiving older instruction operations into the first available entries in said receiving queue; and receiving instruction data into each entry wherein an instruction operation requires said data.

19. An integrated circuit, comprising:

an instruction queue comprising a first number of entries, each entry capable of storing an instruction;

a receiving queue operably coupled to said instruction queue, comprising a second number of entries, each entry capable of storing an instruction;

means for sending instructions from said instruction queue in a sending order to said receiving queue, where said instructions are received in a receiving order; and means operably coupled to said instruction queue and said receiving queue for mapping said sending order to said receiving order.

20. An integrated circuit according to claim 19, wherein said means for mapping comprises:

for each instruction in said instruction queue, an instruction sending vector which indicates the relative age of the instruction compared to the other instructions in said instruction queue; and for each entry in said receiving queue, an in-gate vector, which indicates the receiving order of said receiving queue.

21. An integrated circuit according to claim 19, further comprising:

means for dividing an instruction in said instruction queue into one or more sub-instructions; and means operably coupled to said instruction queue and said receiving queue for mapping an instruction in said instruction queue to one or more sub-instructions in said receiving queue.

22. An integrated circuit according to claim 20, wherein said instruction sending vector and said in-gate vector are combined to create a selection signal for each receiving queue entry, wherein said selection signal determines which entry in said receiving queue receives each instruction from said instruction queue.

23. An integrated circuit according to claim 20, wherein said instructions comprise operations and data, and wherein said instruction sending vector comprises:

an instruction operation sending vector; and an instruction data sending vector.

24. An integrated circuit according to claim 23, wherein said instruction operation sending vector and said in-gate vector are combined to create an operation selection signal, wherein said operation selection signal determines which entry in said receiving queue receives the instruction operation from each instruction in said instruction queue.

25. An integrated circuit according to claim 23, wherein said instruction data sending vector and said in-gate vector are combined to create a data selection signal, wherein said data selection signal determines which one or more entries in said receiving queue receives the instruction data from each instruction in said instruction queue.

26. An integrated circuit according to claim 19, wherein said receiving order is based on age, with older instructions being received into the first available entries in said receiving queue.

27. An integrated circuit according to claim 21, wherein said means for mapping comprises:

means for receiving older instruction operations into the first available entries in said receiving queue; and means for receiving instruction data into each entry wherein an instruction operation requires said data.

28. A system, comprising:

one or more processors;

memory;

a system bus operably coupled to said processors and said memory;

an instruction queue comprising a first number of entries, each entry capable of storing an instruction;

a receiving queue operably coupled to said instruction queue, comprising a second number of entries, each entry capable of storing an instruction;

means for sending instructions from said instruction queue in a sending order to said receiving queue, where said instructions are received in a receiving order; and means operably coupled to said instruction queue and said receiving queue for mapping said sending order to said receiving order.

29. A system according to claim 28, wherein said means for mapping comprises:

for each instruction in said instruction queue, an instruction sending vector which indicates the relative age of the instruction compared to the other instructions in said instruction queue; and for each entry in said receiving queue, an in-gate vector, which indicates the receiving order of said receiving queue.

30. A system according to claim 28, further comprising:

means for dividing an instruction in said instruction queue into one or more sub-instructions; and means operably coupled to said instruction queue and said receiving queue for mapping an instruction in said instruction queue to one or more sub-instructions in said receiving queue.

31. A system according to claim 29, wherein said instruction sending vector and said in-gate vector are combined to create a selection signal for each receiving queue entry, wherein said selection signal determines which entry in said receiving queue receives each instruction from said instruction queue.

32. A system according to claim 29, wherein said instructions comprise operations and data, and wherein said instruction sending vector comprises:

an instruction operation sending vector; and an instruction data sending vector.

33. A system according to claim 32, wherein said instruction operation sending vector and said in-gate vector are combined to create an operation selection signal, wherein said operation selection signal determines which entry in said receiving queue receives the instruction operation from each instruction in said instruction queue.

34. A system according to claim 32, wherein said instruction data sending vector and said in-gate vector are combined to create a data selection signal, wherein said data selection signal determines which one or more entries in said receiving queue receives the instruction data from each instruction in said instruction queue.

35. A system according to claim 28, wherein said receiving order is based on age, with older instructions being received into the first available entries in said receiving queue.

36. A system according to claim 30, wherein said means for mapping comprises:

means for receiving older instruction operations into the first available entries in said receiving queue; and means for receiving instruction data into each entry wherein an instruction operation requires said data.

* * * * *